United States Patent [19]

Kim

[11] Patent Number: 5,757,971
[45] Date of Patent: May 26, 1998

[54] METHOD AND APPARATUS FOR ENCODING A VIDEO SIGNAL OF A CONTOUR OF AN OBJECT

[75] Inventor: Jin-Hun Kim, Seoul, Rep. of Korea

[73] Assignee: Daewoo Electronics Co., Ltd., Seoul, Rep. of Korea

[21] Appl. No.: 738,362

[22] Filed: Oct. 25, 1996

[30] Foreign Application Priority Data

Sep. 19, 1996 [KR] Rep. of Korea .............. 96 40891

[51] Int. Cl.$^6$ .............. G06K 9/36; G06K 9/42; G06K 9/46; G06K 9/48
[52] U.S. Cl. .............. 382/241; 382/238; 382/242; 382/258; 348/390; 348/401; 348/402; 348/409; 348/412; 348/413; 348/416
[58] Field of Search .............. 382/238, 241, 382/242, 258; 348/390, 401, 402, 409, 412, 416, 413

[56] References Cited

U.S. PATENT DOCUMENTS 5,054,103  10/1991  Yasuda et al. .............. 382/238
5,295,201  3/1994   Yokohama .............. 382/241
5,510,838  4/1996   Yomdin et al. .............. 348/390
5,608,458  3/1997   Chen et al. .............. 348/413

*Primary Examiner*—Leo H. Boudreau
*Assistant Examiner*—Daniel G. Mariam
*Attorney, Agent, or Firm*—Pennie & Edmonds LLP

[57] ABSTRACT

A method for encoding a video signal of a current contour of an object based on a previous contour thereof determines a multiple number of first vertex points on the current contour and maps the first vertex points onto the previous contour to thereby provide second vertex points of said multiple number on the previous contour. After approximating the current contour based on the first vertex points to thereby provide a first approximation contour and approximating the previous contour based on the second vertex points to thereby provide a second approximated contour, the method obtains a first set of approximation errors between the current contour and the first approximated contour and a second set of approximation errors between the previous contour and the second approximated contour. The method then calculates a difference between the first and the second sets of approximation errors and encodes the difference to produce encoded data.

20 Claims, 3 Drawing Sheets

METHOD AND APPARATUS FOR ENCODING A VIDEO SIGNAL OF A CONTOUR OF AN OBJECT

FIELD OF THE INVENTION

The present invention relates to a method and apparatus for encoding a contour of an object expressed in a video signal; and, more particularly, to a method and apparatus capable of reducing the amount of transmission data through the use of a contour motion estimation technique.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference system.

One of such techniques for encoding video signals for a low bit-rate encoding system is an object-oriented analysis-synthesis coding technique, wherein an input video image is divided into objects and three sets of parameters for defining the motion, contour and pixel data of each object are processed through different encoding channels.

One example of such object-oriented coding scheme is the so-called MPEG (Moving Picture Experts Group) phase 4 (MPEG-4), which is designed to provide an audio-visual coding standard for allowing content-based interactivity, improved coding efficiency and/or universal accessibility in such applications as low-bit rate communication, interactive multimedia (e.g., games, interactive TV, etc.) and surveillance (see, for instance, MPEG-4 Video Verification Model Version 2.0, International Organization for Standardization, ISO/IEC JTC1/SC29/WG11 N1260, March 1996).

According to MPEG-4, an input video image is divided into a plurality of video object planes (VOP's), which correspond to entities in a bitstream that a user can access and manipulate. A VOP can be referred to as an object and represented by a bounding rectangle whose width and height may be chosen to be smallest multiples of 16 pixels (a macroblock size) surrounding each object so that the encoder processes the input video image on a VOP-by-VOP basis, i.e., object-by-object basis. The VOP includes color information consisting of the luminance component (Y) and the chrominance components (Cr, Cb) and contour information represented by, e.g., a binary mask.

In processing a contour of an object, contour information is important for the analysis and synthesis of the object shape. A classical coding method for representing the contour information is a chain coding method. The chain coding method, however, requires a substantial amount of bits for the representation thereof, although there is no loss in the contour information.

To overcome the drawback, therefore, there have been proposed several methods, such as polygonal approximation and B-spline approximation, to encode the contour information. One of the disadvantages in the polygonal approximation is the roughness of the representation of the contour.

The B-spline approximation is, on the other hand, capable of representing the contour more precisely; however, it requires a high-order polynomial to reduce the approximation error, resulting in an increased overall computational complexity of the video encoder.

One of the techniques introduced to ameliorate such problems associated with the rough representation of the contour or the increased computational complexity in the above approximation approaches is a contour approximation technique employing a discrete sine transform (DST).

In an apparatus which adopts the contour approximation technique based on the polygonal approximation and the DST, as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertex points are determined and the contour of an object is approximated through the use of polygonal approximation for fitting the contour by line segments. And, N sample points for each line segment are selected and an approximation error at each of the N sample points is calculated in order to obtain a set of approximation errors for each line segment. The N sample points are equi-distanced on each line segment and each of the approximation errors represents the distance or displacement between each of the N sample points and the contour. Thereafter, sets of DST coefficients are generated by performing a one-dimensional DST operation on each set of approximation errors.

Even though the aforementioned DST based contour approximation technique is capable of alleviating the rough representation and computational complexity, and somewhat reducing the volume of transmission data, it still remains desirable to further reduce the volume of transmission data.

SUMMARY OF THE INVENTION

It is, therefore, a primary object of the invention to provide an improved contour encoding method and apparatus which is capable of further reducing the amount of transmission data through the use of a contour motion estimation technique.

In accordance with the invention, there is provided a method for encoding a video signal of a current contour of an object based on a previous contour thereof, comprising the steps of:

(a) determining a multiple number of first vertex points on the current contour;

(b) mapping the first vertex points onto the previous contour to thereby provide second vertex points of said multiple number on the previous contour;

(c) approximating the current contour based on the first vertex points to thereby provide a first approximation contour;

(d) approximating the previous contour based on the second vertex points to thereby provide a second approximated contour;

(e) obtaining a first set of approximation errors between the current contour and the first approximated contour and a second set of approximation errors between the previous contour and the second approximated contour;

(f) calculating a difference between the first and the second sets of approximation errors;

(g) encoding the difference to produce encoded data; and (h) providing an encoded video signal of the current contour, the encoded video signal including the encoded data and vertex information representing locations of the first vertex points.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
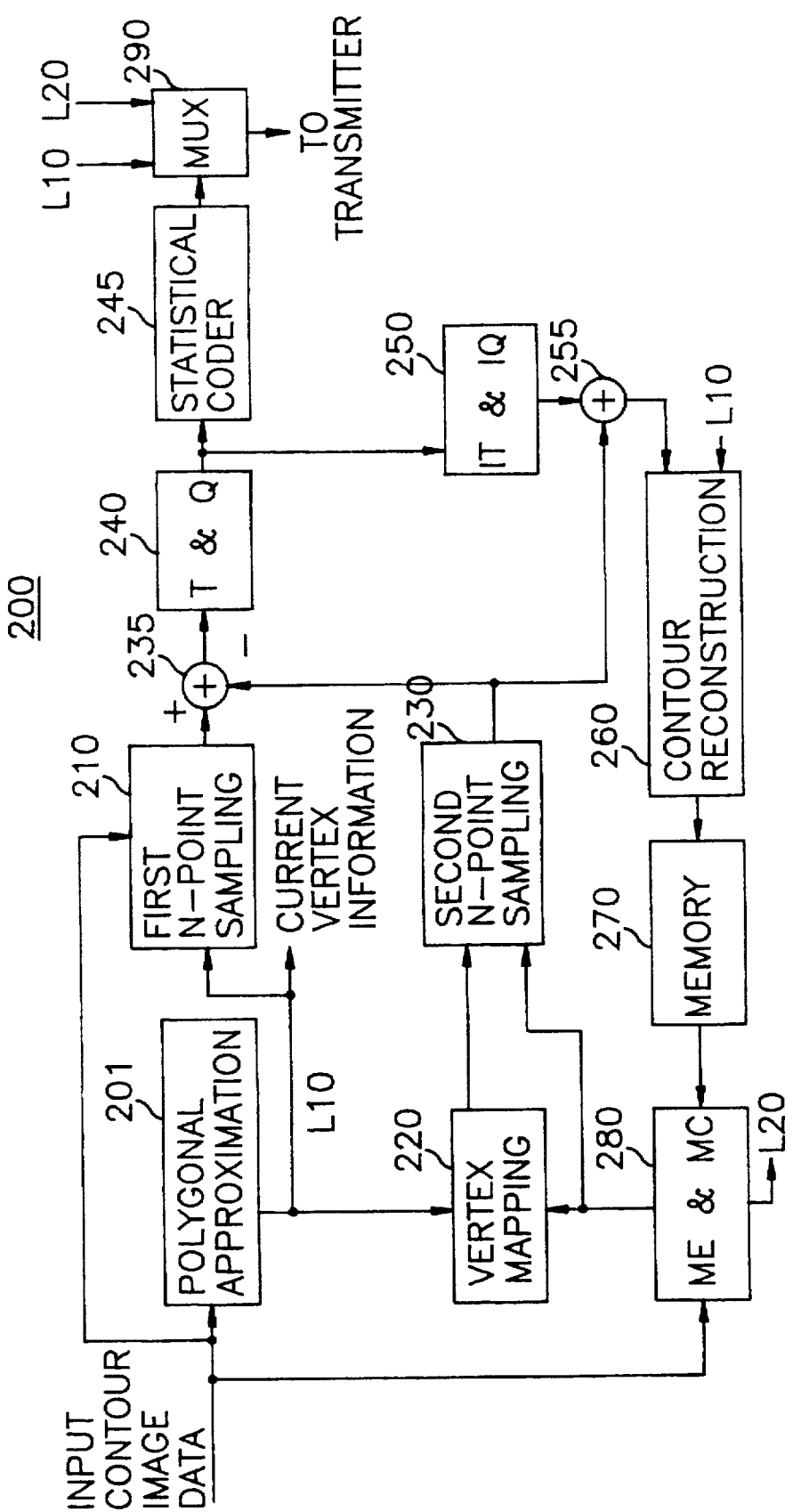
FIG. 1 represents a block diagram of an apparatus for encoding a contour image in accordance with the present invention.

Referring to FIG. 1, there is shown a block diagram of an apparatus 200 for encoding a contour image in accordance with the present invention, wherein input contour image data representing a current contour of an object is fed to a polygonal approximation block 201, a first N-point sampling block 210 and a motion estimation and compensation (ME & MC) block 280. The polygonal approximation block 201 determines current vertex points on the current contour based on the input contour image data through the use of a conventional approximation algorithm for fitting the contour with a plurality of line segments wherein each line segment is formed by connecting two current vertex points disposed adjacent each other along the current contour. From the polygonal approximation block 201, current vertex information representing the positions of the current vertex points is provided via a line L10 to the first N-point sampling block 210, a contour reconstruction block 260 and a multiplexer (MUX) 290.

The first N-point sampling block 210 selects N sample points on each line segment and calculates a first approximation error at each of the N sample points based on the current vertex information and the input contour image data, N being a positive integer. In a preferred embodiment of the invention, the N sample points are equi-distanced such that a distance between two neighboring sample points and the one between a sample point and its neighboring current vertex point are equal to the length of a line segment divided by (N+1). The first approximation error at a sample point on a line segment represents the displacement between the line segment and its corresponding contour segment at the sample point. The first approximation errors are provided to a subtracter 235.

In the meantime, the ME & MC block 280 finds centroids for the current and a previous contours of the object by averaging the coordinates of all the pixel positions on the respective contours and computes a motion vector, i.e., global motion vector (GMV), denoting a spatial displacement between the centroids, wherein the centroid of the current contour is calculated based on the input contour image data while the centroid of the previous contour is obtained based on previous contour image data retrieved from a memory 270. Thereafter, the previous contour is overlapped onto the current contour by shifting the previous contour by GMV and the previous contour shifted is set to a predicted contour. In other words, at the ME & MC block 280, the predicted contour of the object is provided by shifting all the pixels on the previous contour by GMV such that the centroid of the predicted contour coincides with that of the current contour. Outputs from the ME & MC blocks 280 are: GMV to the MUX 290 via a line L20; and predicted contour image data representing the predicted contour to a vertex mapping block 220 and a second N-point sampling block 230.

The vertex mapping block 220, responsive to the current vertex information on the line L10 fed from the polygonal approximation block 201 and the predicted contour image data provided from the ME & MC block 280, determines a predicted vertex point for each of the current vertex points of the current contour, the predicted vertex point representing a nearest point on the predicted contour to each of the current vertex points.

Figure 2:
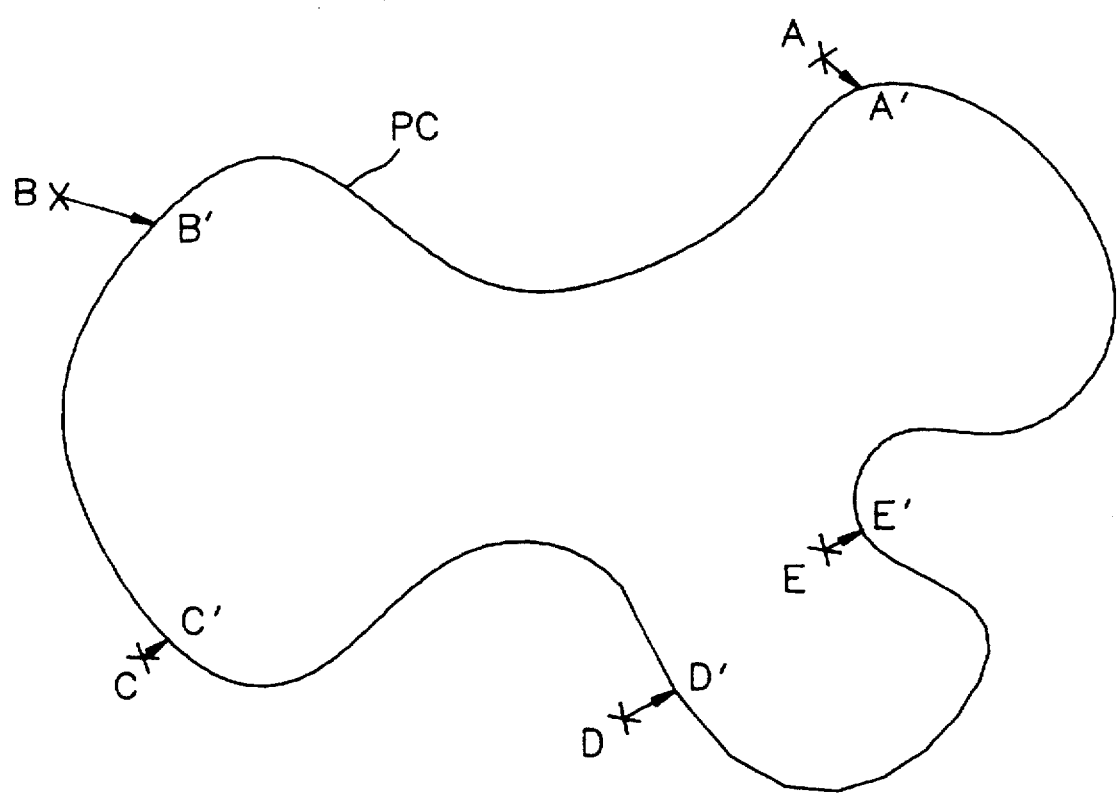
FIG. 2 provides an explanatory diagram for illustrating a vertex mapping procedure in accordance with the present invention.

Referring to FIG. 2, there is illustrated a vertex mapping procedure performed at the vertex mapping block 220, wherein PC represents the predicted contour and A to E denote the current vertex points of the current contour. As shown in the drawing, the current vertex points A to E are mapped to the predicted vertex points A' to E', respectively, each of the predicted vertex points A' to E' being the closest point on the predicted contour PC to its corresponding current vertex point.

Thereafter, the vertex mapping block 220 provides predicted vertex information to the second N-point sampling block 230. The predicted vertex information represents positions of the predicted vertex points.

In response to the predicted vertex information from the vertex mapping block 220 and the predicted contour image data from the ME & MC block 280, the second N-point sampling block 230, as performed in a similar manner at the first N-point sampling block 210, selects N sample points on each line segment formed by a pair of neighboring predicted vertex points and calculates a second approximation error at each of the N sample points with respect to the predicted contour. The second approximation error at a sample point on a predicted line segment joining two adjacent predicted vertex points represents the displacement between the predicted line segment and its corresponding predicted contour segment at the sample point. The second approximation errors calculated at the second N-point sampling block 230 are provided to the subtracter 235 and an adder 255.

Figure 3A:
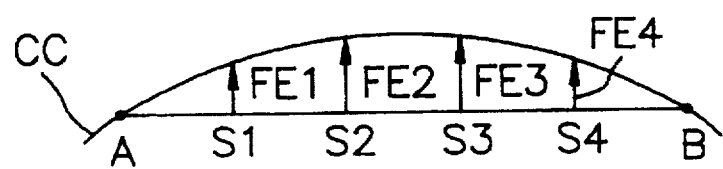
FIGS. 3A and 3B show first and second N-point sampling procedures, respectively, in accordance with the present invention.
Figure 3B:
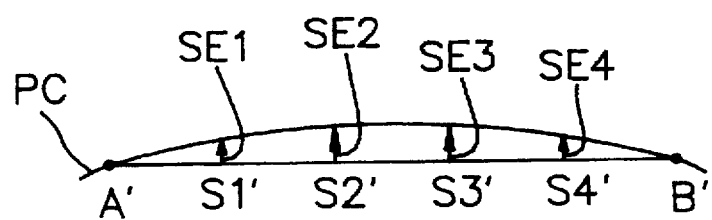

The subtracter 235 subtracts each of the second approximation errors from its corresponding first approximation error fed from the first N-point sampling block 210 and then generates a difference value therebetween to a transform and quantization (T & Q) block 240. Specifically, as exemplarily shown in FIGS. 3A and 3B, if current vertex points A and B of a current contour CC are mapped to predicted vertex points A' and B' on a predicted contour PC, respectively, and if N equals four, and, accordingly, respective line segments AB and A'B' have sample points S1 to S4 and S1' to S4' thereon, the first approximation error FE1 at S1 is subtracted by the second approximation error SE1 at S1'; FE2, by SE2; and so on.

The T & Q block 240 performs one-dimensional discrete sine transform (DST) on a set of predetermined number N of difference values obtained with respect to, e.g., each pair of neighboring current vertex points to produce a set of transform coefficients corresponding thereto; and quantizes each set of transform coefficients to provide a set of quantized transform coefficients to a statistical coder 245 and an inverse transform and inverse quantization (IT & IQ) block 250. It should be apparent to those skilled in the art that even though DST is employed in the preferred embodiment of the invention, other types of transform techniques, e.g., discrete cosine transform (DCT), may be used in lieu of DST.

The IT & IQ block 250 performs IT and IQ operation on each set of quantized transform coefficients to provide a set of reconstructed difference values to the adder 255. The adder 255 combines the reconstructed difference values from the IT & IQ block 250 and the second approximation errors from the second N-point sampling block 230 to thereby reconstruct reconstructed first approximation errors. At a contour reconstruction block 260, the current contour is reconstructed based on the reconstructed first approximation errors received from the adder 255 and the current vertex information applied via the line L10 from the polygonal approximation block 201. Thereafter, the reconstructed current contour image data is stored in the memory 270 as previous contour image data for a subsequent contour.

At the statistical coder 245, each set of quantized transform coefficients is encoded by using, e.g., a variable length coding technique to produce statistically coded data. The statistically coded data is then applied to MUX 290. MUX 290 multiplexes the statistically coded data, the current vertex information on the line L10 and GMV on line L20 to provide a multiplexed bit stream to a transmitter (not shown) for the transmission thereof.

While the present invention has been described with respect to the particular embodiments, it will be apparent to those skilled in the art that various changes and modifications may be made without departing from the scope of the invention as defined in the following claims.

What is claimed is:

1. A method for encoding a video signal of a current contour of an object based on a previous contour thereof, comprising the steps of:

(a) determining a multiple number of first vertex points on the current contour;

(b) mapping the first vertex points onto the previous contour to thereby provide second vertex points of said multiple number on the previous contour;

(c) approximating the current contour based on the first vertex points to thereby provide a first approximation contour;

(d) approximating the previous contour based on the second vertex points to thereby provide a second approximated contour;

(e) obtaining a first set of approximation errors between the current contour and the first approximated contour and a second set of approximation errors between the previous contour and the second approximated contour;

(f) calculating a difference between the first and the second sets of approximation errors;

(g) encoding the difference to produce encoded data; and (h) providing an encoded video signal of the current contour, the encoded video signal including the encoded data and vertex information representing locations of the first vertex points.

2. The method according to claim 1, wherein said step (a) for determining the first vertex points is carried out by using a polygonal approximation technique.

3. The method according to claim 2, wherein said step (b) for mapping the first vertex points includes the steps of:

(b1) obtaining centroids of the current and previous contours, the centroids being obtained by averaging positions of pixels on the respective contours;

(b2) calculating a displacement between the centroids;

(b3) overlapping the current and the previous contours by shifting one of the contours to the other by the displacement;

(b4) finding a pixel on the previous contour closest to one of the first vertex points and setting the pixel as a second vertex point, to thereby provide the multiple number of second vertex points.

4. The method according to claim 3, wherein each of the first and the second sets of approximation errors includes a predetermined number of errors.

5. The method according to claim 4, wherein said step (g) of encoding the difference is carried out by employing encoding schemes including transformation, quantization and statistical coding techniques.

6. The method according to claim 3, wherein the encoded video signal further includes motion information representing the displacement between the centroids.

7. A method for encoding a video signal of a current contour of an object based on a previous contour thereof, comprising the steps of:

(a) determining a multiple number of first vertex points on the current contour;

(b) approximating a current contour segment formed by two first vertex points with a first line segment connecting said two first vertex points, said two first vertex points being adjacent each other along the current contour;

(c) mapping said two first vertex points onto the previous contour to thereby generate two corresponding second vertex points on the previous contour;

(d) approximating a previous contour segment defined by said two second vertex points with a second line segment joining said two second vertex points;

(e) setting N number of sample points on the first and the second line segments, respectively, N being a positive integer;

(f) providing a first set of approximation errors measured with respect to the current contour segment at the sample points on the first line segment and a second set of approximation errors calculated with respect to the previous contour segment at the sample points on the second line segment;

(g) generating a set of differences between the first and the second sets of approximation errors; and (h) encoding the set of differences to thereby provide encoded data.

8. The method according to claim 7, wherein said step (a) for determining the first vertex points is carried out by using a polygonal approximation technique.

9. The method according to claim 8, wherein said mapping step (c) is carried out based on a displacement between centroids of the current and the previous contours, each of the centroids representing a position defined by averaging pixel positions on each of the contours.

10. The method according to claim 8, wherein said step (h) for encoding the set of differences is carried out by using a discrete sine transform.

11. The method according to claim 8, further comprising, after said encoding step (h), the step of (i) providing an encoded video signal of the current contour which includes the encoded data, vertex information representing positions of the first vertex points and motion information denoting the displacement between the centroids.

12. An apparatus for use in a video signal encoder, for compressing a video signal of a current contour of an object with respect to a previous contour thereof, which comprises:

means for determining a plurality of first vertex points on the current contour;

means for providing, based on the first vertex points, second vertex points of said plurality on the previous contour wherein each second vertex point corresponds to one of the first vertex points;

means for approximating the current and the previous contours by a first and a second sets of line segments, respectively, wherein each line segment of the first set is formed by joining two of the first vertex points positioned adjacent each other on the current contour and each line segment of the second set is formed by connecting two of the second vertex points disposed neighboring each other along the previous contour;

means for generating a first set of errors between a current contour segment and a line segment of the first set which are defined by two adjacent first vertex points and a second set of errors between a previous contour segment and a line segment of the second set which are determined by two second vertex points corresponding to said two adjacent first vertex points;

means for calculating a difference between the first and the second sets of errors; and means for encoding the difference.

13. The apparatus according to claim 12, wherein the first vertex points are determined through the use of a polygonal approximation technique.

14. The apparatus according to claim 13, wherein said providing means further includes means for calculating centroids of the current and the previous contours.

15. The apparatus according to claim 14, wherein each of the first and the second sets of errors contains a predetermined number of errors.

16. The apparatus according to claim 15, wherein said generating means include:

means for setting first sample points of said predetermined number on the line segment of the first set and producing, as the first set of errors, displacements between the current contour segment and the line segment of the first set calculated at the respective first sample points; and means for setting second sample points of said predetermined number on the line segment of the second set and producing, as the second set of errors, displacements between the previous contour segment and the line segment of the second set calculated at the respective the second sample points.

17. The apparatus according to claim 16, wherein said means for encoding the difference includes means for converting the difference into a set of transform coefficients by a transform technique.

18. The apparatus according to claim 17, wherein said means for encoding the difference further includes means for quantizing the set of transform coefficients to provide a set of quantized coefficients.

19. The apparatus according to claim 18, wherein said means for encoding the difference further includes means for statistically coding the set of quantized coefficients.

20. The apparatus according to claim 17, wherein said transform technique is a discrete sine transform.

* * * * *